United States Patent
Tanaka et al.

(10) Patent No.: US 10,128,681 B2
(45) Date of Patent: Nov. 13, 2018

(54) NON-CONTACT POWER SUPPLY CONTROL SYSTEM FOR CONTROLLING POWER SUPPLY BY LIVING BODY DETECTION

(71) Applicant: DENSO CORPORATION, Kariya, Aichi-pref. (JP)

(72) Inventors: Yasuhiro Tanaka, Kariya (JP); Atusi Sakaida, Kariya (JP); Toshihisa Taniguchi, Kariya (JP); Norio Gouko, Kariya (JP); Yoshitaro Yazaki, Kariya (JP); Yoshihiko Shiraishi, Kariya (JP); Toshikazu Harada, Kariya (JP); Keita Saitou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 243 days.

(21) Appl. No.: 15/033,032

(22) PCT Filed: Oct. 29, 2014

(86) PCT No.: PCT/JP2014/078730
§ 371 (c)(1),
(2) Date: Apr. 28, 2016

(87) PCT Pub. No.: WO2015/064622
PCT Pub. Date: May 7, 2015

(65) Prior Publication Data
US 2016/0254697 A1 Sep. 1, 2016

(30) Foreign Application Priority Data

Oct. 30, 2013 (JP) ................................ 2013-225555

(51) Int. Cl.
*H02J 7/02* (2016.01)
*H02J 50/80* (2016.01)
(Continued)

(52) U.S. Cl.
CPC ................ *H02J 7/027* (2013.01); *B60L 3/04* (2013.01); *B60L 5/005* (2013.01); *B60L 11/182* (2013.01);
(Continued)

(58) Field of Classification Search
CPC ...... B60L 9/00; B60L 9/08; B60L 9/14; B60L 9/16; B60L 9/24
See application file for complete search history.

(56) References Cited

U.S. PATENT DOCUMENTS

| | | |
|---|---|---|
| 2011/0074346 A1 | 3/2011 | Hall et al. |
| 2012/0139076 A1 | 6/2012 | Shenker et al. |

(Continued)

FOREIGN PATENT DOCUMENTS

| | | |
|---|---|---|
| JP | 2001177917 A | 6/2001 |
| JP | 2010093957 A | 4/2010 |

(Continued)

OTHER PUBLICATIONS

"ICNIRP Guidelines for Limiting Exposure to Time-Varying Electric and Magnetic Fields (1 Hz-100 KHz)" published in Health Physics 99(6):818-836; 2010.

*Primary Examiner* — Robert J McCarry, Jr.
(74) *Attorney, Agent, or Firm* — Harness, Dickey & Pierce, P.L.C.

(57) ABSTRACT

A non-contact power supply control system includes: an electric transmission pad connected to a power source unit; a control unit controlling current supply to the electric transmission pad; a living body detecting means detecting a living body present around the electric transmission pad; a power receiving pad magnetically coupled to the electric transmission pad to excite power, when current is supplied from the power source unit to the electric transmission pad; and a power storage unit storing power excited by the power (Continued)

receiving pad. The living body detecting means are arranged on the road surface side, and the control unit, when determining that no living body is present around the electric transmission pad on the basis of a result from the living body detecting means, controls the power supply unit to supply power to the power storage unit.

6 Claims, 11 Drawing Sheets

(51) Int. Cl.
      *H02J 50/40*       (2016.01)
      *H02J 50/10*       (2016.01)
      *B60M 1/04*       (2006.01)
      *H02J 5/00*       (2016.01)
      *B60L 3/04*       (2006.01)
      *B60L 11/18*       (2006.01)
      *B60L 5/00*       (2006.01)
      *H02J 50/60*       (2016.01)
      *G01V 3/10*       (2006.01)
      *H02J 50/70*       (2016.01)
      *B60M 7/00*       (2006.01)

(52) U.S. Cl.
    CPC ....... *B60L 11/1846* (2013.01); *B60L 11/1848* (2013.01); *B60M 1/04* (2013.01); *G01V 3/10* (2013.01); *H02J 5/005* (2013.01); *H02J 7/025* (2013.01); *H02J 50/10* (2016.02); *H02J 50/40* (2016.02); *H02J 50/60* (2016.02); *H02J 50/70* (2016.02); *H02J 50/80* (2016.02); *B60L 2230/16* (2013.01); *B60L 2240/36* (2013.01); *B60L 2250/10* (2013.01); *B60L 2270/147* (2013.01); *B60M 7/00* (2013.01); *Y02T 10/7005* (2013.01); *Y02T 10/7088* (2013.01); *Y02T 90/121* (2013.01); *Y02T 90/122* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2012/0200151 A1 | 8/2012 | Obayashi et al. |
| 2013/0069441 A1 | 3/2013 | Verghese et al. |
| 2015/0144171 A1 | 5/2015 | Taniguchi et al. |

FOREIGN PATENT DOCUMENTS

| | | | | |
|---|---|---|---|---|
| JP | 2010252498 | * | 11/2010 | ............ B60L 11/182 |
| JP | 2010252498 | A | 11/2010 | |
| JP | 2011120410 | A | 6/2011 | |
| JP | 2012165497 | A | 8/2012 | |
| JP | 2013036516 | A | 2/2013 | |
| JP | 2013051744 | A | 3/2013 | |
| JP | 2014007376 | A | 1/2014 | |
| KR | 20010003884 | A | 1/2001 | |
| WO | WO-2013001812 | A1 | 1/2013 | |
| WO | WO-2013061611 | A1 | 5/2013 | |

* cited by examiner

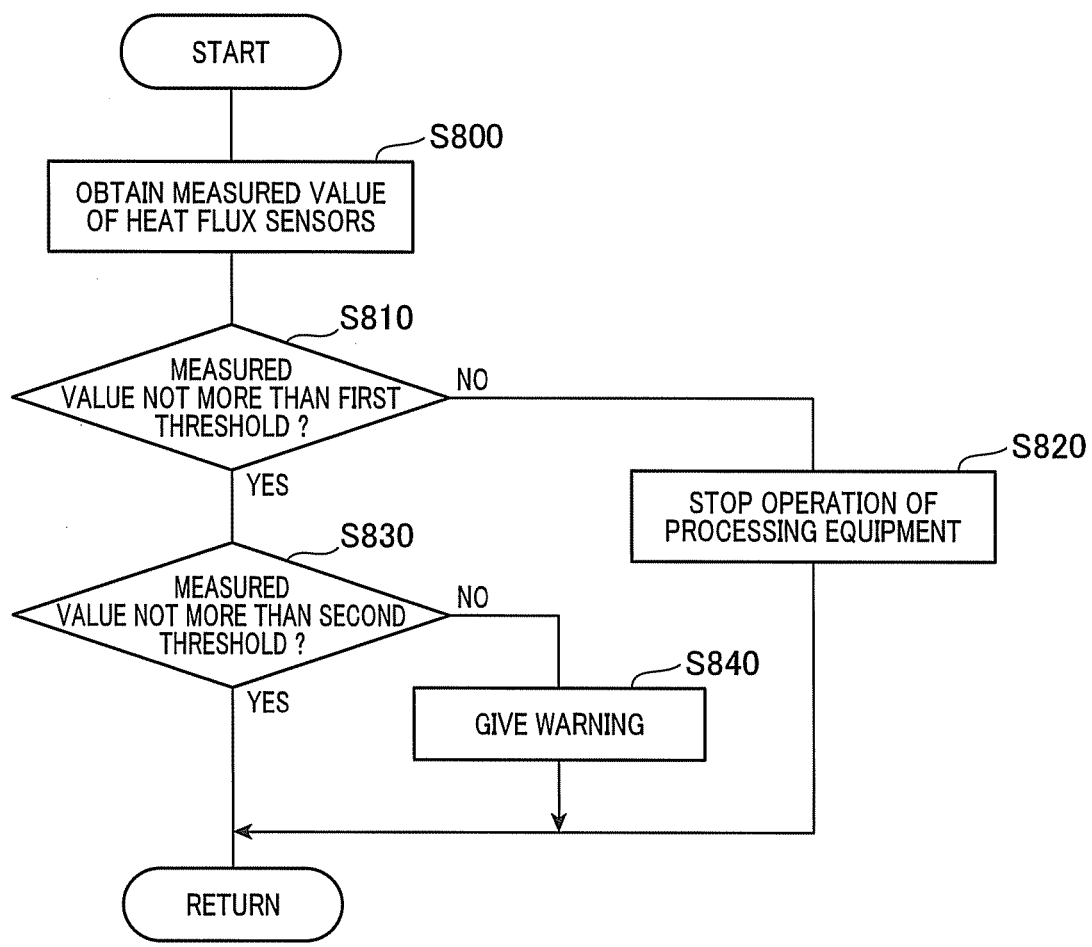

NON-CONTACT POWER SUPPLY CONTROL SYSTEM FOR CONTROLLING POWER SUPPLY BY LIVING BODY DETECTION

CROSS REFERENCE TO RELATED APPLICATIONS

This application is a U.S. National Phase application under 35 U.S.C. 371 of International Application No. PCT/JP2014/078730 filed on Oct. 29, 2014 and published in Japanese as WO 2015/064622 A1 on May 7, 2015. This application is based on and claims the benefit of priority from Japanese Application No. 2013-225555 filed on Oct. 30, 2013. The entire disclosures of all of the above applications are incorporated herein by reference.

BACKGROUND OF THE INVENTION

Technical Field

The present disclosure relates to a non-contact power supply control system, and more particularly, relates to a non-contact power supply control system to supply power in a non-contact manner to a power storage unit mounted to a vehicle from an external power supply unit.

Background Art

There are some known non-contact power supply control systems. For example, JP-A-2012-165497 discloses a non-contact power supply control system as set forth below.

In this non-contact power supply control system, a primary coil is arranged on a road surface side, and a secondary coil that is magnetically coupled to the primary coil is arranged in a bottom part of a vehicle. On the vehicle, a power storage unit is mounted and a camera for capturing an image around the vehicle is mounted.

In the non-contact power supply control system, when current is supplied from an external power supply unit to the primary coil, the primary and secondary coils are magnetically coupled, thereby exciting electric power in the secondary coil. The electric power is stored (charged) in the power storage unit. In other words, power is supplied to the power storage unit in a state where the external power supply unit and the power storage unit are not in contact with each other. Living body detection is performed by capturing an image around the vehicle using a camera mounted to the vehicle, and when there is a living body in the vicinity of the vehicle, current supply to the primary coil is adjusted, thereby minimizing application of an electromagnetic field to the living body.

PTL 1: JP-A-2012-165497

However, in the non-contact power supply control system mentioned above, living body detection is performed using a camera mounted to the vehicle. However, actually, a living body, such as a dog or a cat, may be present on a road surface side. Therefore, there is a concern that sufficient living body detection is not necessarily performed due to the blind spots or the like of the camera.

SUMMARY

Hence it is desired to provide a non-contact power supply control system that is capable of minimizing application of an electromagnetic field to a living body when non-contact power supply is performed.

A power storage unit according to a typical example includes: an electric transmission pad arranged on a road surface side and connected to an external power source unit; a control unit controlling the power source unit to control current supplied to the electric transmission pad; a living body detecting means detecting a living body present around the electric transmission pad; a power receiving pad mounted to a vehicle and magnetically coupled to the electric transmission pad to excite electric power, when current is supplied from the power source unit to the electric transmission pad; and a power storage unit mounted to the vehicle to store power excited by the power receiving pad. The power storage unit has characteristics as set forth below.

The living body detecting means is arranged on the road surface side, and the control unit, when determining the living body as not being present around the electric transmission pad on the basis of a result from the living body detecting means, controls the power source unit to supply current to the electric transmission pad, thereby exciting power in the power receiving pad to store the power in the power storage unit.

In this configuration, the living body detecting means is provided on the road surface side. Accordingly, living body detection can be performed with high accuracy on the road surface side where a living body is likely to be actually present. Further, power is supplied to the power storage unit if it is determined that the living body is not present around the electric transmission pad. Accordingly, an electromagnetic field is prevented from being applied to the living body.

In this case, a power storage unit according to a second example includes a metal detecting means arranged on the road surface side to detect metal which is present around the electric transmission pad. The control unit, when determining that no living body is present around the electric transmission pad on the basis of the result from the living body detecting means and when determining that no metal is present around the electric transmission pad on the basis of a result from the metal detecting means, controls the power source unit to cause the power storage unit to store power.

When power is supplied to the power storage unit in the case where metal is present around the electric transmission pad, there is a possibility that the electric transmission pad is deformed or broken down due to the influence of the heated metal. However, the power storage unit of the second example can minimize the occurrence of such a problem. Further, there is a concern that the metal after being heated may be blown away by a gust of wind and contact the living body causing a burn injury to a living body. However, the power storage unit of the second example can minimize the occurrence of such a problem.

In this case, as in a power storage unit according to a third example, heat flux sensors common to the living body detecting means and the metal detecting means can be used to output sensor signals according to the heat flux.

With this configuration, the number of components can be reduced comparing with the case where sensors for the living body detecting means and the metal detecting means are separately configured.

The reference signs in parentheses of the respective means in this section and the claims indicate correspondence with specific means described in embodiments set forth below.

BRIEF DESCRIPTION OF DRAWINGS

In the accompanying drawings:

FIG. 13 is a flow chart illustrating an operation of a control unit.

DETAILED DESCRIPTION OF PREFERRED EMBODIMENTS

With reference to the drawings, some embodiments of the present disclosure will be described. In the following embodiments, the components identical with or equivalent to each other are given the same reference signs.

First Embodiment

With reference to the drawings, a first embodiment of the present disclosure will be described. A non-contact power supply control system of the present embodiment is favorably applied to the case where power is stored in (supplied to) a power storage unit installed in an electric vehicle (EV), a plug-in hybrid vehicle (PHV), or the like.

Figure 1:
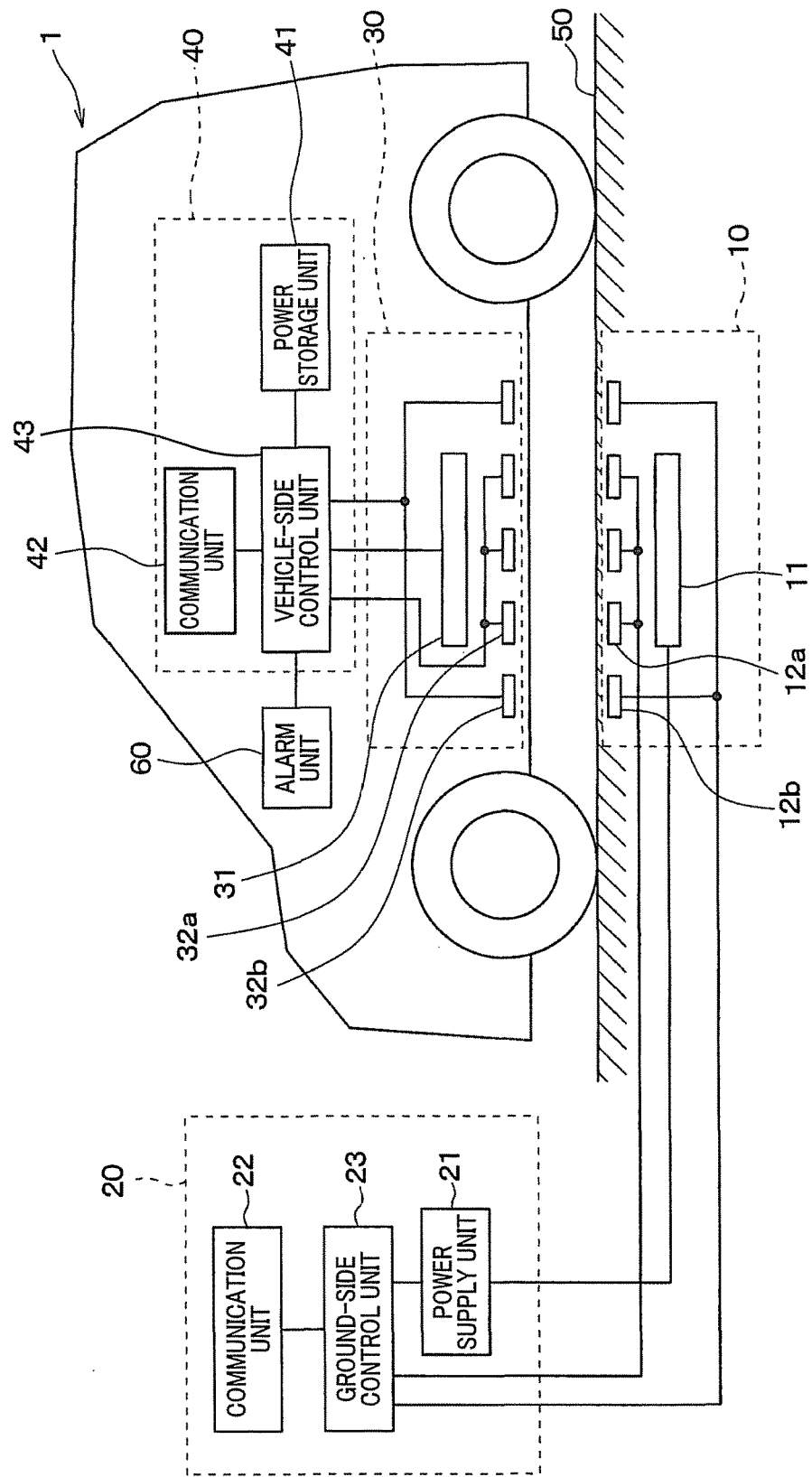
FIG. 1 is a schematic view illustrating a configuration of a non-contact power supply control system according to a first embodiment of the present disclosure.

As shown in FIG. 1, a non-contact power supply control system of the present embodiment is provided with an electric transmission section 10 to supply electric power when current is passed therethrough, and a ground-side power supply section 20 to control current passed to the electric transmission section 10. Further, the system is provided with a power receiving section 30 mounted to a vehicle 1 to excite electric power without being in contact with the electric transmission section 10 by being magnetically coupled to the electric transmission section 10, and a vehicle-side power receiving section 40 mounted to the vehicle 1 and having a power storage unit 41 to store electric power.

Figure 2:
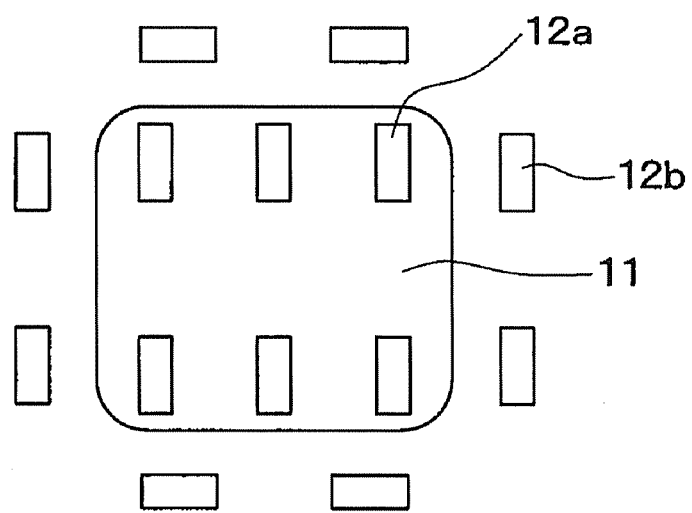
FIG. 2 is a diagram illustrating a layout of an electric transmission pad and heat flux sensors as viewed from a direction normal to a road surface.

The electric transmission section 10 is arranged on or buried under a road surface 50 in a parking space for the vehicle 1, and provided with an electric transmission pad 11 having a coil (primary coil) to which current is supplied from the ground-side power supply section 20, a plurality of inner heat flux sensors 12a and outer heat flux sensors 12b arranged around the electric transmission pad 11, and the like. Specifically, as shown in FIGS. 1 and 2, when viewed from a direction normal to the road surface 50 (electric transmission pad 11), the inner heat flux sensors 12a are arranged so as to be positioned within (immediately above) the electric transmission pad 11, and the outer heat flux sensors 12b are arranged so as to surround the outer perimeter of the electric transmission pad 11.

The inner and outer heat flux sensors 12a and 12b output sensor signals (electromotive voltage) in accordance with heat flux of the heat passing through the inner and outer heat flux sensors 12a and 12b in a thickness direction. The specific configuration of the sensors will be described later. In the present embodiment, the inner and outer heat flux sensors 12a and 12b are equivalent to the living body detecting means and the metal detecting means of the present disclosure.

The ground-side power supply section 20 is built up or buried in a parking space for the vehicle 1 or around the parking space. The ground-side power supply section 20 includes a power supply unit 21, a communication unit 22 and a ground-side control unit 23. In the present embodiment, the ground-side control unit 23 is equivalent to the control unit of the present disclosure.

The power supply unit 21 is connected to an external commercial power supply or the like, not shown, while being connected to the electric transmission pad 11. The power supply unit 21 supplies electric power to drive the ground-side power supply section 20, and passes or interrupts current to be supplied to the electric transmission pad 11 under the control of the ground-side control unit 23.

The communication unit 22 is configured to enable communication with a communication unit 42 provided in the vehicle 1, described later, by wired or wireless communication, or the like.

The ground-side control unit 23 is configured with a CPU, various memories constituting the storing means, and peripheral devices, and connected to the power supply unit 21, the communication unit 22, and the heat flux sensors 12a and 12b. The ground-side control unit 23 passes or interrupts current to be supplied to the electric transmission pad 11 by controlling the power supply unit 21 on the basis of a measured value of the heat flux sensors 12a and 12b and heat flux sensors 32a and 32b, described later, mounted to the vehicle 1.

The power receiving section 30 is arranged on the lower side of the vehicle 1 and includes a power receiving pad 31 having a coil (secondary coil) where electric power is excited by being magnetically coupled to the coil in the electric transmission pad 11, and a plurality of inner heat flux sensors 32a and outer heat flux sensors 32b arranged around the power receiving pad 31.

The relationship of the power receiving pad 31 with the inner and outer heat flux sensors 32a and 32b is the same as the relationship of the electric transmission pad 11 with the inner and outer heat flux sensors 12a and 12b. In other words, when viewed from a direction normal to the power receiving pad 31, the inner heat flux sensors 32a are arranged so as to be positioned within (immediately above) the power receiving pad 31, and the outer heat flux sensors 32b are arranged so as to surround the outer perimeter of the power receiving pad 31. In addition, the inner and outer heat flux sensors 32a and 32b output sensor signals (electromotive voltage) in accordance with heat flux passing through the inner and outer heat flux sensors 32a and 32b in a thickness direction, a specific configuration of which will be described later.

The vehicle-side power receiving section 40 is installed in the vehicle 1 and includes the power storage unit 41, the communication unit 42, and a vehicle-side control unit 43.

The power storage unit 41 is configured with a generally used secondary battery, such as a nickel-cadmium battery, a nickel-metal hydride battery, a lithium ion battery or a lithium battery, and stores electric power excited by the power receiving pad 31 (power supplied from the electric transmission pad 11).

The communication unit 42 is configured to enable communication with the communication unit 22 of the ground-side power supply section 20 by wired or wireless communication, or the like.

The vehicle-side control unit 43 is a vehicle ECU configured with a CPU, various memories constituting the storing means, peripheral devices, and the like, and is connected to the power receiving pad 31, the respective heat flux sensors 32a and 32b, the power storage unit 41, the communication unit 42, and the like. The vehicle-side control unit 43 stores the electric power excited by the power receiving pad 31 of the power storage unit 41, and transmits a signal indicating a charging rate (state of charge) of the power storage unit 41 and a signal indicating sensor signals inputted from the heat flux sensors 32a and 32b, to the ground-side control unit 23 via the communication units 42 and 22. The vehicle-side control unit 43 is also connected to an alarm unit 60 that includes an audio means, a lighting means and a display means, which are not shown.

The non-contact power supply control system of the present embodiment is configured as described above. Hereinafter, configuration of the inner heat flux sensors 12a, 32a and the outer heat flux sensors 12b, 32b is specifically described. The inner heat flux sensors 12a, 32a and the outer heat flux sensors 12b, 32b all have the same configuration, and thus the configuration will be described taking an inner heat flux sensor 12a as an example.

Figure 3:
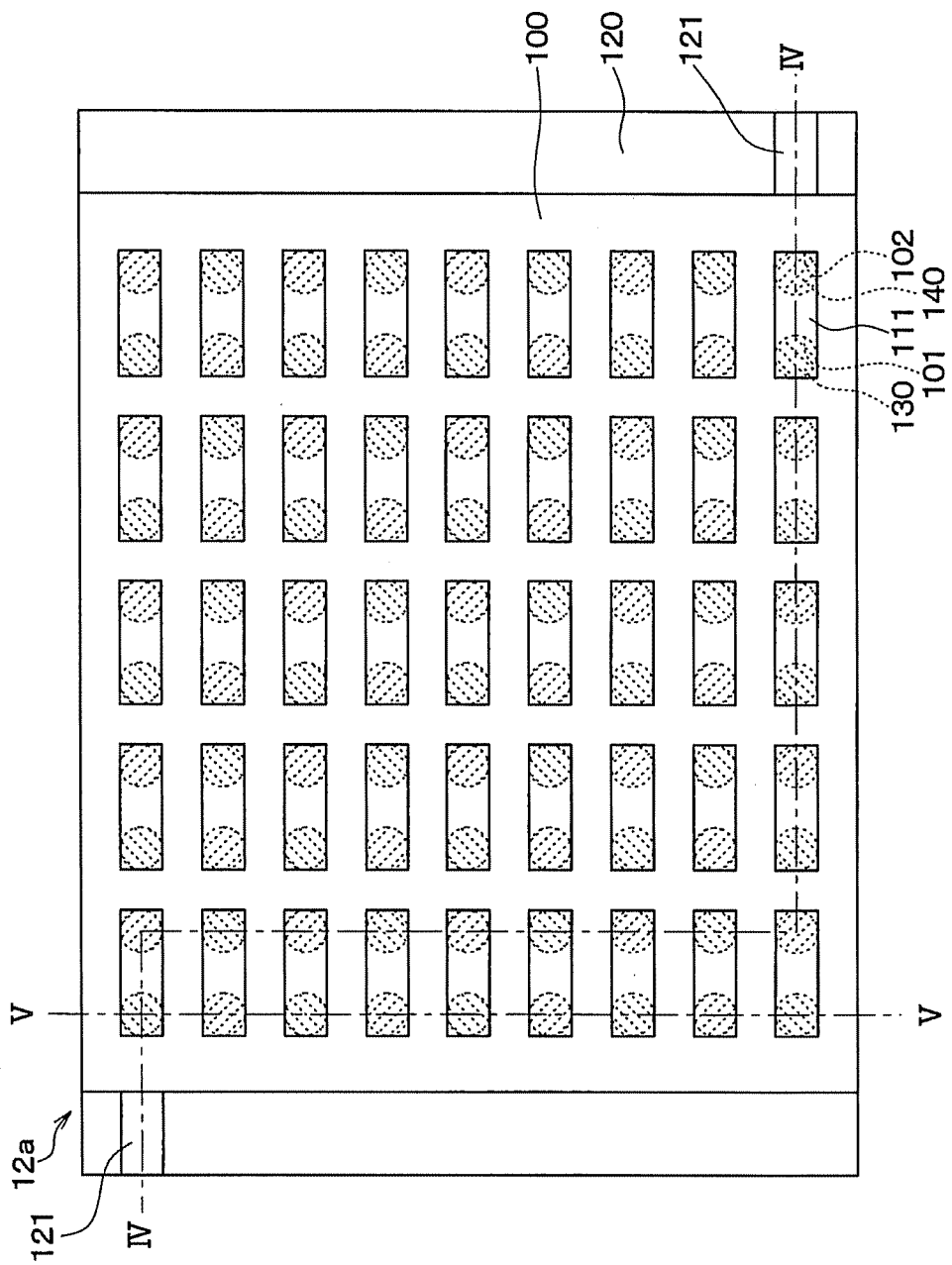
FIG. 3 is a plan view of the heat flux sensors illustrated in FIG. 1.
Figure 4:
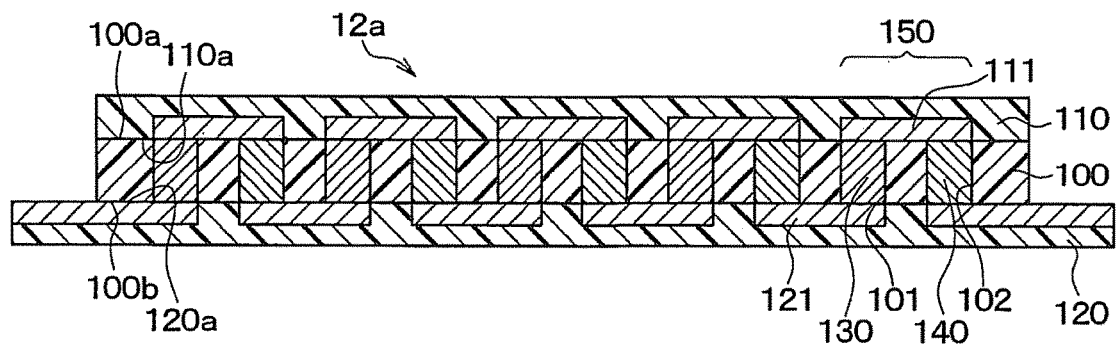
FIG. 4 is a cross-sectional view taken along a line IV-IV of FIG. 3.
Figure 5:
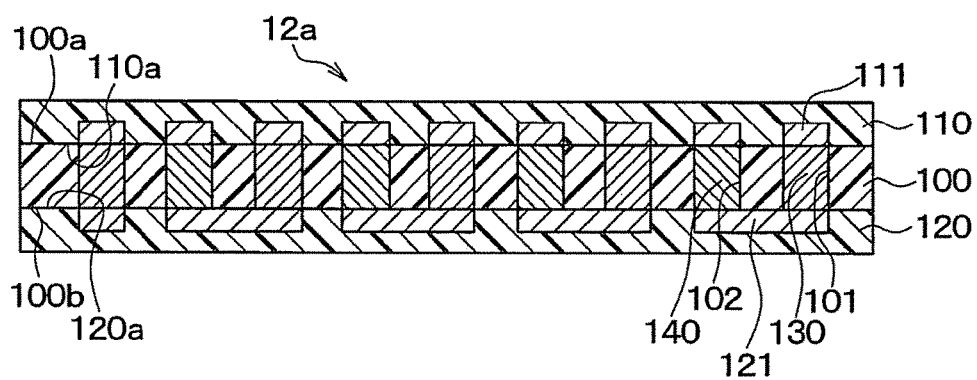
FIG. 5 is a cross-sectional view taken along a line V-V of FIG. 3.

Each inner heat flux sensor 12a basically includes, as shown in FIGS. 3 to 5, an integrated body of an insulating substrate 100, a front surface protective member 110, and a back surface protective member 120, and inside the integrated body, first and second interlayer connection members 130 and 140 are alternately connected in series. In FIG. 3, for the sake of clarity, the front surface protective member 110 is omitted.

Specifically, in the present embodiment, the insulating substrate 100 is formed of a thermoplastic resin film in a rectangular shape in plan view, which is typically made of a polyether ether ketone (PEEK), a polyether imide (PEI), or a liquid crystal polymer (LCP). In the substrate 100, a plurality of first and second via holes 101 and 102 penetrating in a thickness direction are alternately formed in a staggered pattern.

The first and second via holes 101 and 102 of the present embodiment are each in a cylindrical shape with a constant diameter from a front surface 100a towards a back surface 100b. However, these via holes may each have a tapered shape with a diameter decreasing from a front surface 100a towards a back surface 100b, or may have a tapered shape with a diameter decreasing from the back surface 100b towards the front surface 100a, or may be formed into a polygonal cylindrical shape.

The first interlayer connection members 130 are arranged in the respective first via holes 101, and the second interlayer connection members 140 are arranged in the respective second via holes 102. In other words, the first and second interlayer connection members 130 and 140 are arranged in an alternate fashion in the insulating substrate 100.

The first and second interlayer connection members 130 and 140 are made of metals different from each other to exhibit Seebeck effect (to generate an electromotive voltage). For example, the first interlayer connection members 130 are each made of a metal compound (sintered alloy) obtained by solid-phase sintering a P-type Bi—Sb—Te alloy powder so as to maintain the same crystal structure of the plurality of metal atoms after being sintered. The second interlayer connection members 140 are each made of a metal compound obtained by solid-phase sintering an N-type Bi—Te alloy powder so as to maintain a crystal structure of the plurality of metal atoms before being sintered. Thus, using the solid-phase sintered metal compounds to maintain predetermined crystal structures as the first and second interlayer connection members 130 and 140, the electromotive voltage can be increased.

Although FIG. 3 is not a cross-sectional view, the first and second interlayer connection members 130 and 140 are hatched for the sake of clarity.

On the front surface 100a of the insulating substrate 100, there is arranged the front surface protective member 110 formed of a thermoplastic resin film in a rectangular shape in plan view, typically made of a polyether ether ketone (PEEK), a polyether imide (PEI), and a liquid crystal polymer (LCP). The shape of the front surface protective member 110 in plan view is of the same size as that of the insulating substrate 100. The front surface protective member has a surface 110a facing the insulating substrate 100. In the surface 110a, a plurality of front surface patterns 111 are formed by patterning a copper foil or the like so as to be spaced apart from each other. The front surface patterns 111 are electrically connected as appropriate to the respective first and second interlayer connection members 130 and 140.

Specifically, as shown in FIG. 4, when one first interlayer connection member 130 and one second interlayer connection member 140 that are adjacent are defined as a pair 150, the first and second interlayer connection members 130 and 140 of each pair 150 are connected to a common front surface pattern 111. In other words, the first and second interlayer connection members 130 and 140 of each pair 150 are electrically connected to each other via the front surface pattern 111. In the present embodiment, the pair 150 is defined to be one first interlayer connection member 130 and one second interlayer connection member 140 that are adjacent along the longitudinal direction (right-and-left direction as viewed in FIG. 4) of the insulating substrate 100.

The insulating substrate 100 has the back surface 100b on which the back surface protective member 120 is arranged, which is made up of a thermoplastic resin film in a rectangular shape in plan view, typically made of a polyether ether ketone (PEEK), a polyether imide (PEI), or a liquid crystal polymer (LCP). The back surface protective member 120 has a length longer than that of the insulating substrate 100, in a longitudinal direction of the insulating substrate 100, and is arranged on the back surface 100b of the insulating substrate 100, with both end portions being projected in a longitudinal direction from the insulating substrate 100.

The back surface protective member 120 has a surface 120a facing the insulating substrate 100. In the surface 120a, a plurality of back surface patterns 121 are formed by patterning a copper foil or the like so as to be spaced apart from each other. The back surface patterns 121 are electrically connected as appropriate to the respective first and second interlayer connection members 130 and 140.

Specifically, as shown in FIG. 4, in the pairs 150 adjacent in a longitudinal direction of the insulating substrate 100, the first interlayer connection member 130 in one pair 150 and the second interlayer connection member 140 in the other pair 150 are connected to a common back surface pattern 121. In other words, between the pairs 150, the first and second interlayer connection members 130 and 140 are bridged by and electrically connected via a common back surface pattern 121.

As shown in FIG. 5, at an outer edge of the insulating substrate 100, the first and second interlayer connection members 130 and 140 adjacent along a direction (up-and-down direction as viewed in FIG. 3) perpendicular to a longitudinal direction are connected to a common back surface pattern 121. Describing in detail, the adjacent first and second interlayer connection members 130 and 140 in the perpendicular direction are connected to a common back surface pattern 121 such that the first and second interlayer connection members 130 and 140 connected in series in a longitudinal direction of the insulating substrate 100 via the front surface patterns 111 and the back surface patterns 121 can be turned back.

Of the back surface patterns 121, as shown in FIGS. 3 and 4, portions at the ends of the serial connection mentioned above are formed being exposed from the insulating substrate 100. The portions of the back surface patterns 121 exposed from the insulating substrate 100 serve as terminals to be connected to the ground-side control unit 23.

The inner heat flux sensors 12a of the present embodiment each have the basic configuration as described above. The inner heat flux sensors 32a and the outer heat flux sensors 12b, 32b are also configured in a manner similar to the inner heat flux sensors 12a. In the inner and outer heat flux sensors 32a and 32b, the portions of the back surface patterns 121 exposed from the insulating substrate 100 serve as terminals to be connected to the vehicle-side control unit 43.

Such inner heat flux sensors 12a, 32a and outer heat flux sensors 12b, 32b output sensor signals (electromotive voltage) according to heat flux of the heat passing through the inner heat flux sensors 12a, 32a and the outer heat flux sensors 12b, 32b in a thickness direction. This is because the change in the heat flux causes change in the electromotive voltage generated in the first and second interlayer connection members 130 and 140 alternately connected in series.

That is, when a living body, such as a person, dog or cat, is present around the inner heat flux sensors 12a, 32a and the outer heat flux sensors 12b, 32b, the inner heat flux sensors 12a, 32a and the outer heat flux sensors 12b, 32b output sensor signals according to radiant heat emitted from the living body. In addition, when heated metal, such as a coin or nut, is present around the inner heat flux sensors 12a, 32a and the outer heat flux sensors 12b, 32b, the inner heat flux sensors 12a, 32a and the outer heat flux sensors 12b, 32b output sensor signals according to radiant heat emitted from the metal. It should be noted that the thickness direction of the inner heat flux sensors 12a, 32a and the outer heat flux sensors 12b, 32b corresponds to a direction of laminating the insulating substrate 100, the front surface protective member 110, and the back surface protective member 120.

Figure 6:
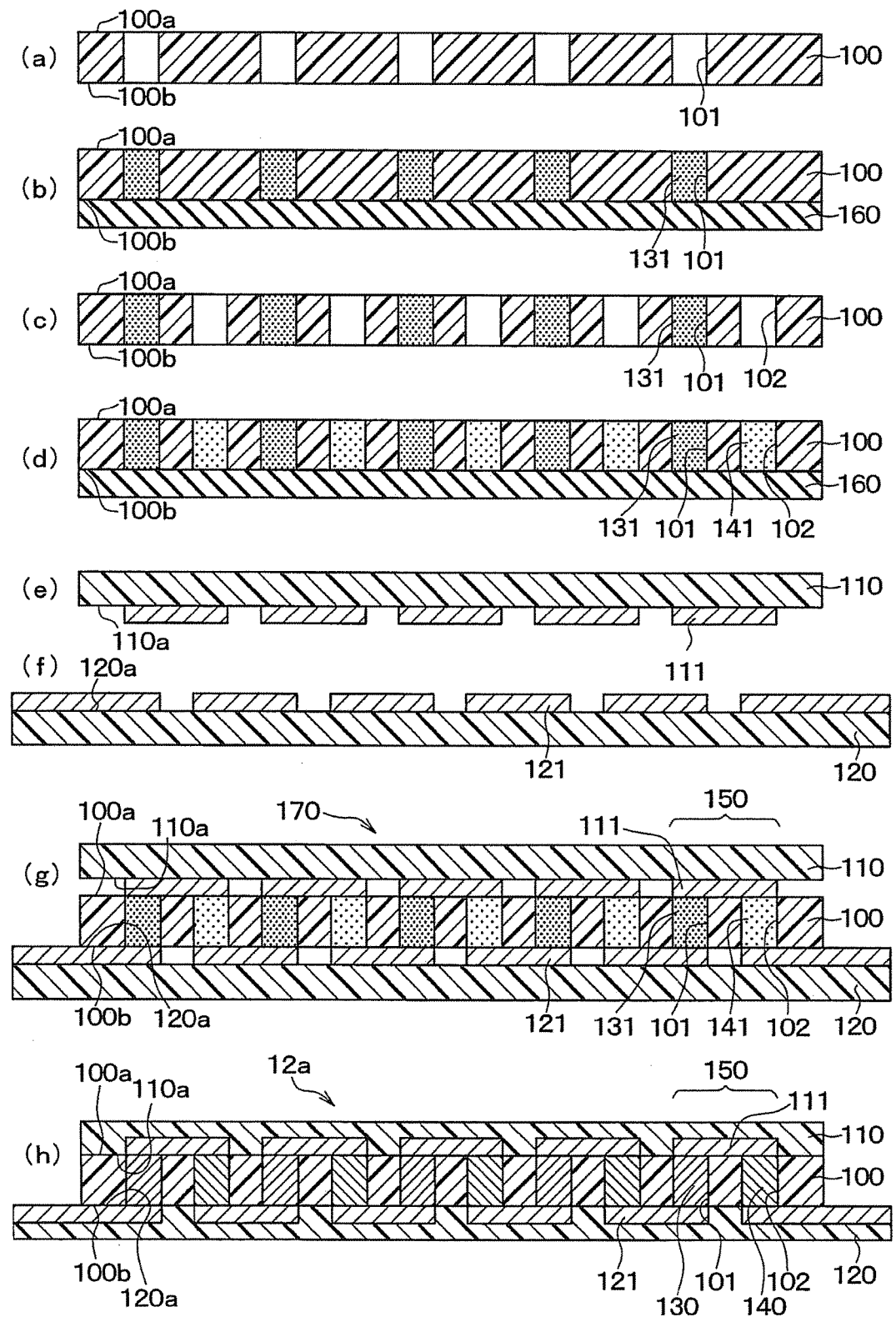
FIG. 6 is a set of cross-sectional views illustrating a procedure of manufacturing the heat flux sensors.

Hereinafter, a method of fabricating the inner heat flux sensors 12a will be described with reference to FIG. 6. The inner heat flux sensors 32a and the outer heat flux sensors 12b, 32b are also fabricated through the same method.

Firstly, as shown in FIG. 6(a), the insulating substrate 100 is provided and the plurality of first via holes 101 are formed by means of a drill, a laser, or the like.

Then, as shown in FIG. 6(b), the first via holes 101 are filled with a first conductive paste 131. As a method (device) of filling the first via holes 101 with the first conductive paste 131, the method described in Japanese Patent Application No. 2010-050356 filed by the present applicant may be employed.

Briefly describing the method, the insulating substrate 100 is arranged on a holding table, not shown, via absorption paper 160 such that the back surface 100b will be opposed to the absorption paper 160. Then, the first conductive paste 131, while being melted, is filled in the first via holes 101. Thus, most of an organic solvent in the first conductive paste 131 is adsorbed by the absorption paper 160, and the alloy powder is permitted to be intimately in contact with the first via holes 101.

The absorption paper 160 only has to be a material that is capable of adsorbing the organic solvent in the first conductive paste 131, and thus general high quality paper can be used. The material used for the first conductive paste 131 is a paste material obtained by adding an organic solvent, such as paraffin, having a melting point of 43° C., to a Bi—Sb—Te alloy powder in which the metal atoms maintain a predetermined crystal structure. For this reason, the first conductive paste 131 is filled in the via holes in a state where the front surface 100a of the insulating substrate 100 is heated to approximately 43° C.

Subsequently, as shown in FIG. 6(c), the plurality of second via holes 102 are formed in the insulating substrate 100 by means of a drill, a laser, or the like. The second via holes 102 are alternated with the first via holes 101 as mentioned above and formed so as to configure a staggered pattern together with the first via holes 101.

Then, as shown in FIG. 6(d), the second via holes 102 are filled with a second conductive paste 141. This procedure can be similar to the one shown in FIG. 6(b).

That is, the insulating substrate 100 is again arranged on the holding table, not shown, via the absorption paper 160 such that the back surface 100b will be opposed to the absorption paper 160, followed by filling the second via holes 102 with the second conductive paste 141. Thus, most of an organic solvent in the second conductive paste 141 is adsorbed by the absorption paper 160 and the alloy powder is arranged in intimate contact with the second via holes 102.

The material used for the second conductive paste 141 is a paste material obtained by adding an organic solvent, such as turpentine, having a melting point of room temperature, to a Bi—Te alloy powder in which the metal atoms different from those constituting the first conductive paste 131 maintain a predetermined crystal structure. In other words, the material used for the organic solvent constituting the second conductive paste 141 is one having a melting point lower than that of the organic solvent constituting the first conductive paste 131. The second conductive paste 141 is filled in the via holes in a state where the front surface 100a of the insulating substrate 100 is retained to be room temperature. In other words, the second conductive paste 141 is filled in the via holes in a state where the organic solvent contained in the first conductive paste 131 is solidified. Thus, the second conductive paste 141 is prevented from being trapped in the first via holes 101.

The state where the organic solvent contained in the first conductive paste 131 is solidified refers to a state where, in the procedure of FIG. 6(b) mentioned above, the organic solvent remains in the first via holes 101 without being adsorbed by the absorption paper 160.

Then, in a procedure separate from the procedures mentioned above, as shown in FIGS. 6(e) and 6(f), a copper foil or the like is formed on the surfaces 110a and 120a of the front and the back surface protective members 110 and 120, respectively, facing the insulating substrate 100. Then, by appropriately patterning the copper foil, there are provided the front surface protective member 110 where the plurality of front surface patterns 111 are formed being spaced apart from each other, and the back surface protective member 120 where the plurality of back surface patterns 121 are formed being spaced apart from each other.

After that, as shown in FIG. 6(g), the back surface protective member 120, the insulating substrate 100, and the front surface protective member 110 are laminated in this order to constitute a laminate 170.

In the present embodiment, the back surface protective member 120 has a length in a longitudinal direction longer than that of the insulating substrate 100. Then, the back surface protective member 120 is arranged such that both end portions in a longitudinal direction are projected from the insulating substrate 100.

Subsequently, as shown in FIG. 6(h), the laminate 170 is arranged between a pair of press plates, not shown, and pressed while being heated in a vacuum state from above and below in a lamination direction to integrate the laminate 170. On this occasion, the first and second conductive pastes 131 and 141 are solid-phase sintered to form the first and second interlayer connection members 130 and 140, respectively, which are brought into contact with the front and back surface patterns 111 and 121.

In integrating the laminate 170, a buffer, such as a rock wool sheet, may be arranged between the laminate 170 and each of the press plates. The heat flux sensors 12a, 12b, 32a, and 32b are fabricated as described above.

Figure 7:
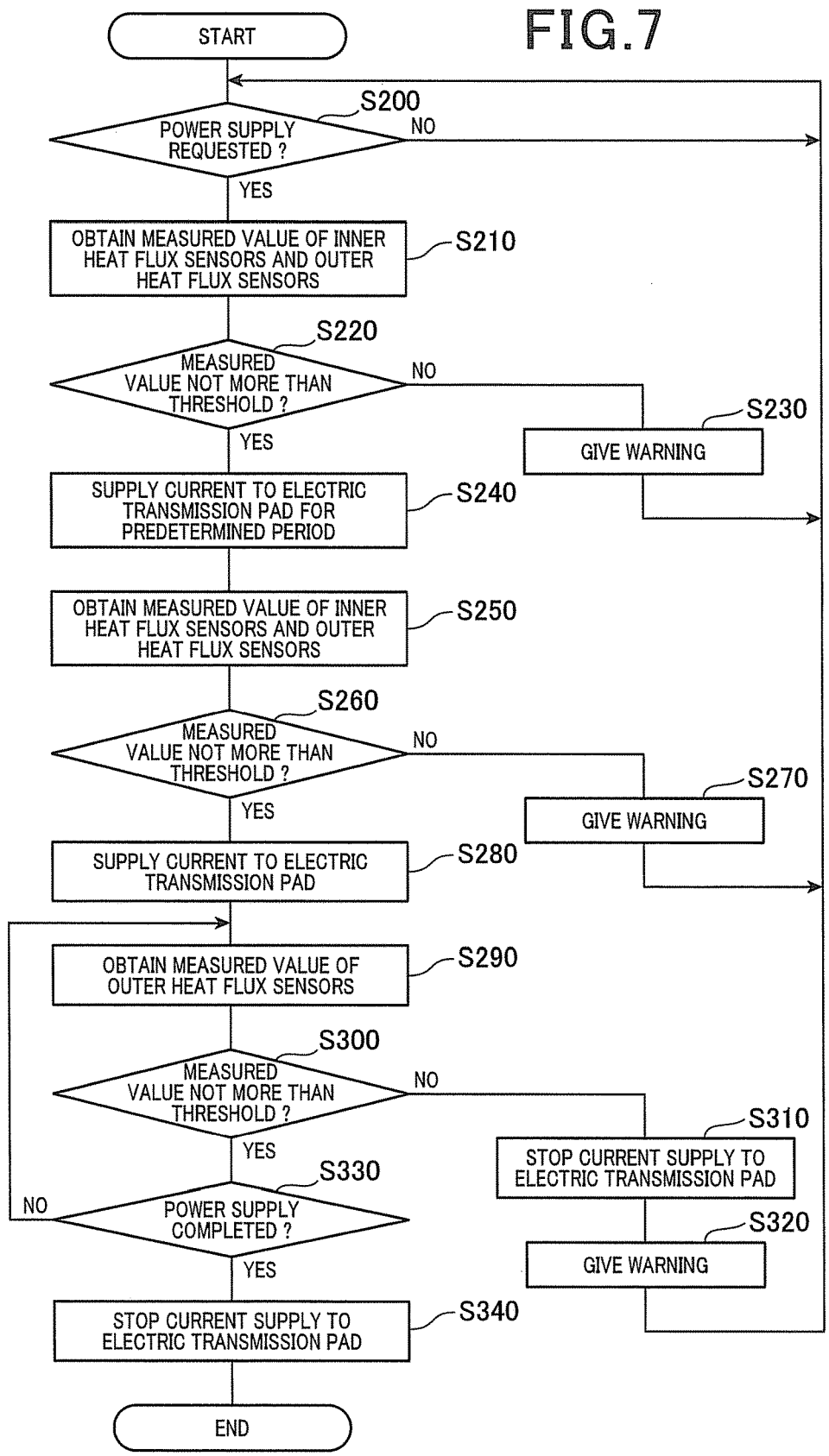
FIG. 7 is a flow chart illustrating an operation of a ground-side control unit.

Referring now to FIG. 7, an operation of the ground-side control unit 23 in the non-contact power supply control system will be described. The non-contact power supply control system of the present embodiment is configured such that the electric transmission section 10 and the ground-side power supply section 20 can be appropriately positioned with respect to the power receiving section 30 and the vehicle-side power receiving section 40, respectively. The following description sets forth a process after the vehicle 1 has been stopped such that the power receiving pad 31 is opposed to the electric transmission pad 11.

Firstly, it is determined whether there is a power supply request from a user (passenger) (S200). The determination at step S200 is based on, for example, a user's (passenger's) operating a touch screen mounted to the vehicle to instruct a power supply request, followed by the vehicle-side control unit 43 transmitting a signal indicating the power supply request to the ground-side control unit 23 via the communication units 42 and 22. Thus, by determining the presence of the signal, it is determined whether power supply has been requested by a user (passenger). In the case where a touch screen for a user's touch operation is arranged in the ground-side power supply section 20, a determination is made depending on whether a user has operated the touch screen by touch.

Then, if it is determined that there is a power supply request (YES at S200), a measured value of the inner heat flux sensors 12a, 32a and the outer heat flux sensors 12b, 32b is obtained (S210). Specifically, based on the sensor signals sent from the inner and outer heat flux sensors 12a and 12b, a measured value of the outer heat flux sensors 12b and 32b is obtained. Further, by sending a request signal to the vehicle-side control unit 43 via the communication units 22 and 42, a measured value based on the sensor signals of the inner and outer heat flux sensors 32a and 32b is also obtained. That is, at step S210, the measured value based on the sensor signals of all the heat flux sensors 12a, 12b, 32a, and 32b is obtained.

The measured value obtained at step S210 may be based on sensor signals (electromotive voltage) outputted from the inner heat flux sensors 12a, 32a and the outer heat flux sensors 12b, 32b, or may be a heat flux value obtained by converting the sensor signals into heat flux.

After that, it is determined, at step S210, whether the obtained measured value is not more than a threshold (S220). In other words, it is determined whether a living body is present around the inner heat flux sensors 12a, 32a and the outer heat flux sensors 12b, 32b. In other words, living body detection is performed. As described above, when a living body is present around the inner heat flux sensors 12a, 32a and the outer heat flux sensors 12b, 32b, the level of the sensor signals become large due to the radiant heat emitted from the living body. The above-mentioned determination is made on the basis of the change in the sensor signals.

Then, if the measured value is larger than the threshold (NO at S220), it is determined that there is a living body around the inner heat flux sensors 12a, 32a and the outer heat flux sensors 12b, 32b. In other words, it is determined that there is a living body around the electric transmission pad 11 and the power receiving pad 31. In this case, when current is supplied to the power storage unit 41 by supplying current to the electric transmission pad 11, there is a concern that the electromagnetic field generated by the electric transmission pad 11 is applied to the living body and the living body is adversely affected by the electromagnetic field. Therefore, a signal for issuing an alarm is transmitted to the vehicle-side control unit 43 via the communication units 22 and 42, so that the vehicle-side control unit 43 can control the alarm unit 60 to have it issued an alarm (S230). After that, the control returns to step S200.

The alarm at step S230 is issued, for example, as follows. That is, the alarm can be an electronic sound such as of a horn as an audio means in the alarm unit 60, or the alarm can be lighting of the head light, interior light or tail light, or flashing of the hazard light or the like as a lighting means. Alternatively, the presence of a living body may be displayed for notification on a liquid crystal display, as a display means, arranged in a part of a gauge display panel which is disposed in front of the steering wheel or at the center of the dashboard. In this case, since the living body may be a dog, a cat, or the like, a passenger may be notified of the presence of the living body, while alerting the living body, such as a dog or a cat, so as to run away from around the electric transmission pad 11 and the power receiving pad 31, by appropriately combining the audio means and the lighting means.

If it is determined that the measured value is not more than a threshold (YES at S220), the power supply unit 21 is controlled to supply current to the electric transmission pad 11 for a predetermined period (S240). Step S240 is performed to heat metal, such as a coin or a nut, when present on the road surface 50 around the electric transmission pad 11, and thus not much weight is put on supplying current to the power storage unit 41. Accordingly, the predetermined period at step S240 is a short period only sufficient for heating the metal, and current supply to the electric transmission pad 11 is stopped after lapse of the predetermined period.

Subsequently, the measured value of the inner heat flux sensors 12a, 32a and the outer heat flux sensors 12b, 32b is obtained in a manner similar step S210 (S250). The measured value obtained at step S250 may be, similar to step S210, based on sensor signals (electromotive voltage), or may be based on a heat flux value obtained by converting the sensor signals to heat flux.

Then, it is determined whether the measured value obtained at step S250 is not more than a threshold (S260). In other words, a determination is made as to whether metal is present around the inner heat flux sensors 12a, 32a and the outer heat flux sensors 12b, 32b. In other words, metal detection is performed. As described above, since metal is heated at step S240 as described above when the metal is present around the electric transmission pad 11, level of the sensor signals becomes large due to radiant heat emitted from the metal. The determination mentioned above is made on the basis of the change in the sensor signals. The threshold at step S260 may be the same as the one at step S220, or may be different from the one at step S220.

Then, if the measured value is determined to be larger than the threshold (NO at S260), it is determined that metal is present around the inner heat flux sensors 12a, 32a and the outer heat flux sensors 12b, 32b. In other words, it is determined that metal is present around the electric transmission pad 11 and the power receiving pad 31. In this case, since the metal is heated when current is passed to the power storage unit 41 by supplying current to the electric transmission pad 11, there is a concern that the electric transmission pad 11 may be deformed or broken being adversely affected by the heated metal. Also, there is a concern that the heated metal may be blown away by a gust of wind or the like and contact with a living body to cause a burn injury to the living body. For this reason, a signal for issuing an alarm is transmitted to the vehicle-side control unit 43 via the communication units 22 and 42, so that the vehicle-side control unit 43 can control the alarm unit 60 to have it issue an alarm (S270). After that, control returns to step S200.

The alarm at step S270 can be issued, in a manner similar to the alarm at step S230, by appropriately driving the audio means, the lighting means, the display means, and the like. Since the alarm is for when metal is detected, the alarm does not have to be issued in such a way of causing a living body, such as a dog or a cat, to run away.

If it is determined that the measured value obtained at step S250 is not more than the threshold (YES at S260), the power supply unit 21 is controlled to start current supply to the electric transmission pad 11 (S280). In other words, when neither a living body nor metal is determined to be present around the electric transmission pad 11 and the power receiving pad 31, the power supply unit 21 is controlled to start current supply to the electric transmission pad 11.

Thus, the coil (primary coil) included in the electric transmission pad 11 and the coil (secondary coil) included in the power receiving pad 31 are magnetically coupled to excite electric power (electromagnetic induction) in the coil included in the power receiving pad 31. Then, the excited electric power is appropriately converted in the vehicle-side control unit 43, and then stored in (charged to) the power storage unit 41. In the present embodiment, when step S280 is started, a signal indicating a state of charge (SOC) of the power storage unit 41 is ensured to be inputted from the vehicle-side control unit 43 to the ground-side control unit 23 via the communication units 42 and 22.

When step S280 is performed, a measured value of the outer heat flux sensors 12b and 32b is obtained (S290). It should be noted that a measured value of only the outer heat flux sensors 12b and 32b is obtained at step S290. In the meantime, a measured value of the outer heat flux sensors 32b is obtained in a manner similar to steps S210 and S250.

The reason why a measured value of only the outer heat flux sensors 12b and 32b is obtained is that the inner heat flux sensors 12a and 32a are prone to be influenced by the electromagnetic field generated between the electric transmission pad 11 and the power receiving pad 31. Similar to steps S210 and S250, the measured value obtained at step S290 may be based on sensor signals (electromotive voltage) or may be based on a heat flux value obtained by converting the sensor signals to heat flux.

Then, it is determined whether the measured value obtained at step S290 is not more than a threshold (S300). This step is performed because, after start of step S280, a living body may step into, or metal may roll into the vicinity of the electric transmission pad 11 and the power receiving pad 31. If the measured value is determined to be larger than the threshold (NO at S300), a living body or metal is determined to be present around the electric transmission pad 11 and the power receiving pad 31. Therefore, the power supply unit 21 is controlled to stop current supply to the electric transmission pad 11 (S310). Also, by transmitting a signal for issuing an alarm to the vehicle-side control unit 43 via the communication units 22 and 42, the vehicle-side control unit 43 controls the alarm unit 60 to have it issue an alarm (S320). After that, control returns to step S200.

The threshold at step S300 may be the same as or may be different from the threshold at steps S220 and S260. Further, in a manner similar to the alarm at step S230, the alarm at step S320 can be issued by driving the audio means, the lighting means, the display means, or the like. In this case, since no determination can be made as to whether an object present around the electric transmission pad 11 and the power receiving pad 31 is a living body or metal, the alarm for a living body, such as a dog or a cat, to run away is preferably issued together.

If the measured value obtained at step S290 is determined to be not more than the threshold (YES at S300), it is determined whether power supply has been completed (S330). The signal, which indicates a state of charge (SOC) sent from the vehicle-side control unit 43 via the communication units 22 and 42, is used in making a determination at step S330.

If it is determined that power supply is yet to be completed (NO at S330), control returns to step S290. In contrast, if power supply is determined to have been completed (YES at S330), current supply to the electric transmission pad 11 is stopped by controlling the power supply unit 21 (S340), and the process is terminated.

As described above, in the present embodiment, the heat flux sensors 12a and 12b are arranged on the road surface 50 side to perform living body detection around the electric transmission pad 11. Therefore, living body detection on the road surface 50 side where there is a high probability of a living body being actually present is performed with high accuracy. Further, since current is supplied to the electric transmission pad 11 when no living body is determined to be present around the electric transmission pad 11, an electromagnetic field is prevented from being applied to a living body.

In addition to the living body detection, metal detection is also performed, so that current is supplied to the electric transmission pad 11 when metal is not present around the electric transmission pad 11. If power is supplied to the power storage unit 41 with metal being present around the electric transmission pad 11, there is a concern that the electric transmission pad 11 is deformed or broken down being adversely affected by the heated metal. However, such a problem can be prevented from occurring. Also, there is a concern that the heated metal may be blown away by a gust of wind or the like and contact with the living body to cause a burn injury to a living body. However, such a problem can be prevented from occurring.

Further, the heat flux sensors 12a, 12b, 32a, and 32b are commonly used as the living body detecting means and the metal detecting means. Thus, the number of components can be reduced.

The heat flux sensors 12a, 12b, 32a, and 32b output higher sensor signals as the distance is shorter from the heat flux sensors 12a, 12b, 32a, and 32b to a detected object (a living body or metal). Therefore, the heat flux sensors 12a and 12b (the living body detecting means and the metal detecting means) are arranged on the road surface 50 side where there is a high probability of a living body or metal being actually present, thereby performing living body detection and metal detection with high sensitivity and high accuracy.

The living body detection is performed first and then the metal detection is performed. Therefore, when current is supplied to the electric transmission pad 11 for metal detection (S240), an electromagnetic field is prevented from being applied to a living body.

When viewed from a direction normal to the road surface 50, the outer heat flux sensors 12b are arranged surrounding the outer perimeter of the electric transmission pad 11. Therefore, while power is supplied to the power storage unit 41, a measured value of the outer heat flux sensors 12b can be compared with a threshold to perform living body detection and metal detection.

Further, the heat flux sensors 32a and 32b are also arranged on the power receiving section 30 side. This enables detection with higher sensitivity and higher accuracy.

In the present embodiment, the first and second via holes 101 and 102 are formed in the insulating substrate 100 made of a thermoplastic resin and the first and second interlayer connection members 130 and 140 are arranged in the first and second via holes 101 and 102, respectively, to configure each of the heat flux sensors 12a, 12b, 32a, and 32b. Therefore, with appropriate modification in the number, diameter, interval, and the like of the first and second via holes 101 and 102, the first and second interlayer connection members 130 and 140 can be arranged with high density. Thus, the electromotive voltage is increased and the heat flux sensors 12a, 12b, 32a, and 32b are imparted with high sensitivity.

Further, in each of the heat flux sensors 12a, 12b, 32a, and 32b of the present embodiment, the metal compounds (Bi—Sb—Te alloy and Bi—Te alloy), which are solid-phase sintered to maintain the same crystal structure as before being sintered, are used as the first and second interlayer connection members 130 and 140. That is, the metals forming the first and second interlayer connection members 130 and 140 are sintered alloys as a result of being sintered in a state of the plurality of metal atoms maintaining their crystal structure. Thus, in comparison with the case where the metals forming the first and second interlayer connection members 130 and 140 are liquid-phase sintered alloys, the electromotive voltage is increased and the heat flux sensors 12a, 12b, 32a, and 32b can be imparted with high sensitivity.

Second Embodiment

A second embodiment of the present disclosure will be described. In the present embodiment, in contrast to the first embodiment, an electric transmission unit 10 is arranged at a road surface 50 where a vehicle 1 runs. Since the rest of the configuration is similar to the first embodiment, description is omitted here.

Figure 8:
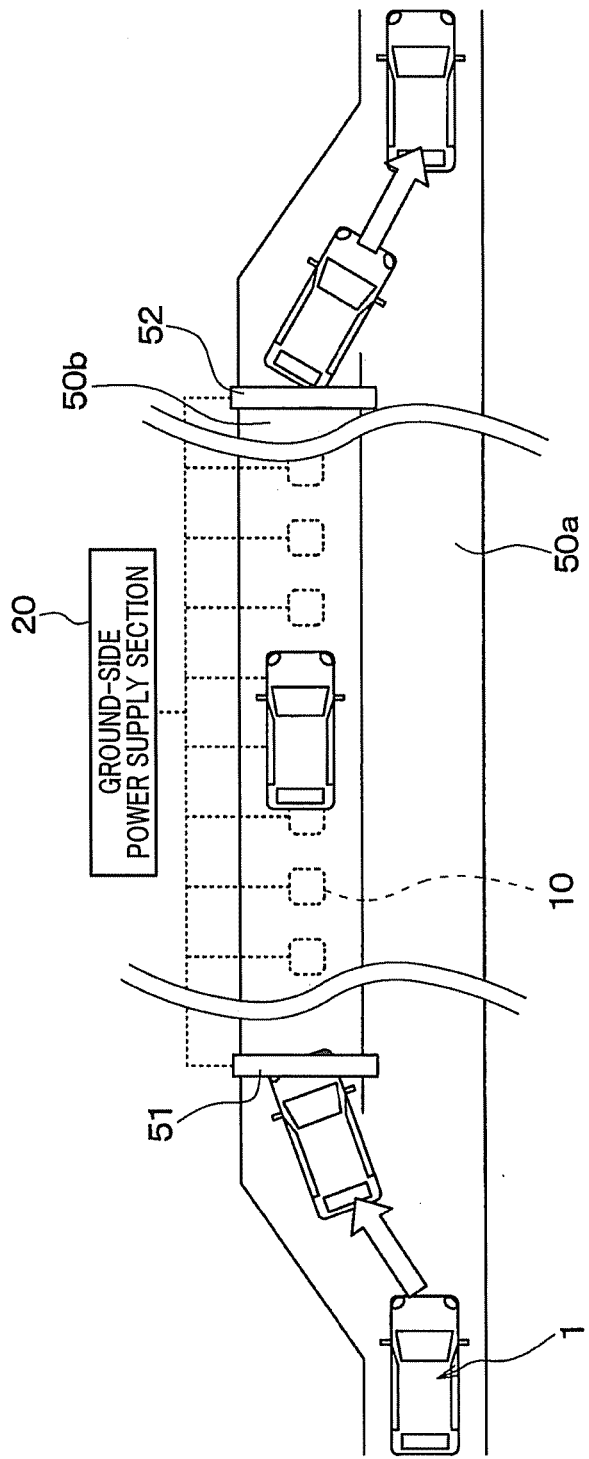
FIG. 8 is a schematic view illustrating a configuration of a non-contact power supply control system according to a second embodiment of the present disclosure.

As shown in FIG. 8, in the present embodiment, the road surface 50 where the vehicle runs includes a main lane 50a and a charge lane 50b. In the charge lane 50b, several electric transmission units 10 are built up or buried.

The charge lane 50b includes an entrance gate 51 arranged on an entrance side in a running direction and an exit gate 52 arranged on an exit side. The entrance and exit gates 51 and 52 are configured so as to be able to communicate with a vehicle-side control unit 43.

A ground-side power supply section 20 basically has a configuration similar to that of the first embodiment described above. A power supply unit 21 is connected to an electric transmission pad 11 of each electric transmission section 10 in the charge lane 50b. A ground-side control unit 23 is connected to heat flux sensors 12a, 12b, 32a, and 32b of each electric transmission section 10 in the charge lane 50b, and connected to the entrance and exit gates 51 and 52 in the charge lane 50b in a manner enabling communication therewith.

When the vehicle 1 passes through the entrance and exit gates 51 and 52 while transmitting a signal indicating a power supply request, the ground-side control unit 23 controls the entrance and exit gates 51 and 52 such that signals indicating accordingly are transmitted from the gates. The ground-side control unit 23 is configured to specify whether a vehicle 1 requesting power supply is present in the charge lane 50b. Specifically, the ground-side control unit 23 is configured to specify whether a vehicle 1 requesting power supply is present in the charge lane 50b by incrementing a count of vehicle 1 when a vehicle 1 requesting power supply passes through the entrance gate 51 and decrementing the count of vehicle 1 when a vehicle 1 requesting power supply passes through the exit gate 52.

Figure 9:
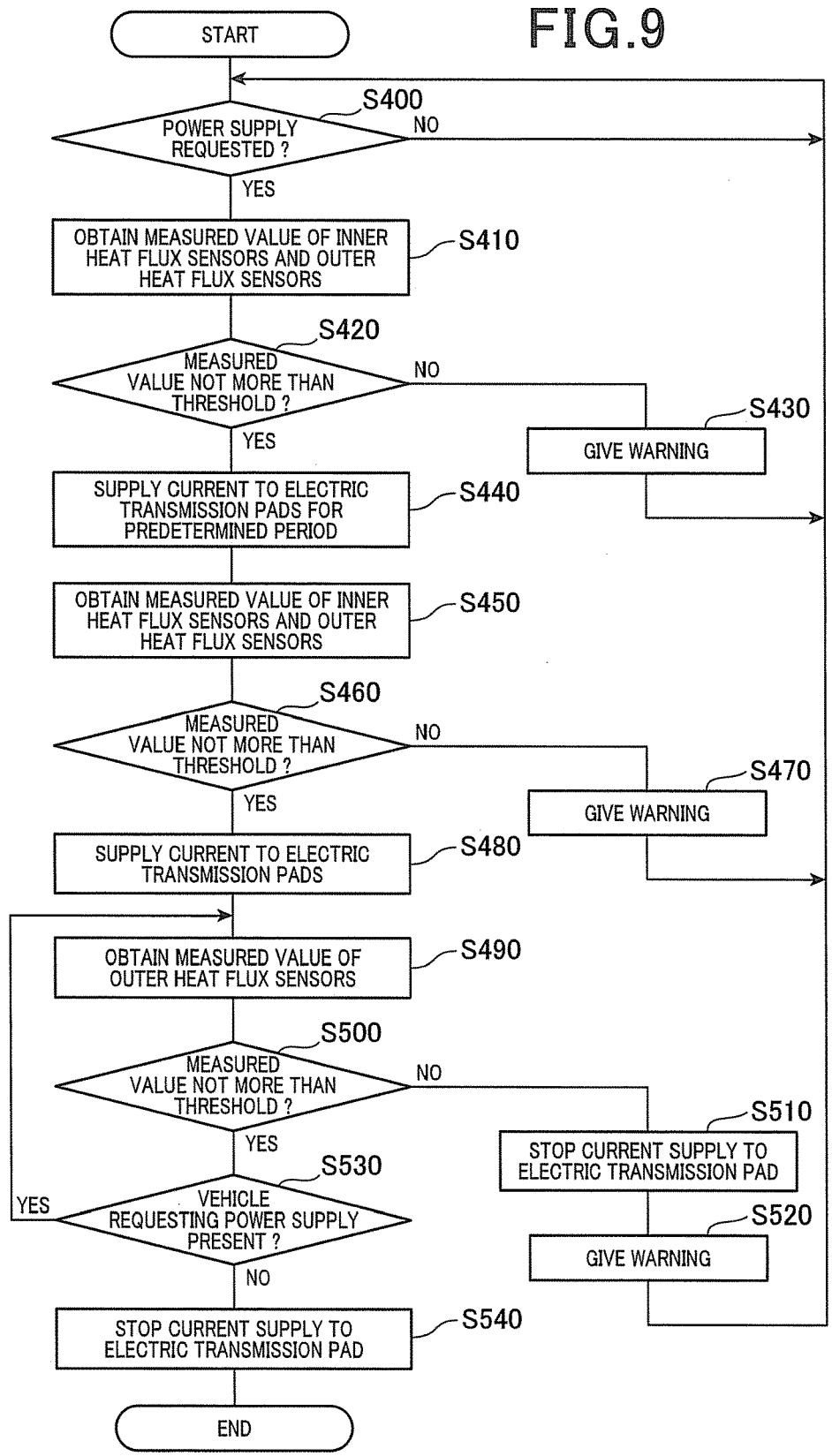
FIG. 9 is a flow chart illustrating an operation of a ground-side control unit.

The non-contact power supply control system of the present embodiment is configured as described above. Referring now to FIG. 9, an operation of the ground-side control unit 23 of the present embodiment will be described, however, since the operation is basically similar to the one shown in FIG. 7, the following description will be focused on differences.

Firstly, it is determined whether there is a power supply request from a user (passenger) (S400). For example, when a vehicle 1 passes through the entrance gate 51 while transmitting a signal indicating a power supply request, a signal indicating accordingly is transmitted from the entrance gate 51. Thus, the determination at step S400 is made by determining the presence of the signal.

After that, all the electric transmission units 10 built up or buried in the charge lane 50b are permitted to perform steps similar to those of steps S210 to S270. That is, living body detection is performed (S410, S420), and if a living body is determined to be present (NO at S420), the vehicle-side control unit 43 is caused to control an alarm unit 60 to issue an alarm (S430). Then, control returns to step S400.

The alarm at step S430 only has to notify a passenger of the presence of a living body by producing an electronic sound as an audio means in the alarm unit 60, or by displaying the presence of a living body on a display as a display means. Together with the notification to the passenger, a signal indicating information on the presence of a living body and information on the electric transmission section 10 where the living body is present is sent to a road administrator over a network or the like.

If a living body is determined not to be present (YES at S420), metal detection is performed (S440 to S460). If metal is determined to be present (NO at S460), the vehicle-side control unit 43 is caused to control the alarm unit 60 to raise an alarm (S470), and then control returns to step S400. These steps are performed with respect to only those electric transmission units 10 which have been determined that there is no living body around the electric transmission pads 11.

The alarm at step S470 is emitted to the passenger in a manner similar to step S430. Together with the notification to the passenger, a signal indicating information on the presence of metal and information on the electric transmission section 10 where the metal is present is sent to a road administrator over a network or the like.

If metal is determined not to be present (YES at S460), current supply to the electric transmission pads 11 is started (S480). Thus, when the vehicle 1 passes over the electric transmission pads 11 supplied with current, power is stored in the power storage unit 41.

Step S480 is performed with respect to only those electric transmission pads 11 which there is no living body or metal in the vicinity. In other words, although a plurality of electric transmission units 10 are built up or buried in the charge lane 50b, those electric transmission pads 11 which have been determined to have a living body or metal in the vicinity are excluded from current supply.

Then, steps similar to steps S290 to S320 are performed. Then, while current is passed to the electric transmission pads 11, a determination is made as to possible presence of a living body and metal around the electric transmission pads 11 (S490, S500).

If it is determined that a living body or metal is present (NO at S500), current supply to the electric transmission pads 11 concerned is stopped (S510), followed by causing the vehicle-side control unit 43 to control the alarm unit 60 to have it issued an alarm (S520). Then, control returns to step S400.

The alarm at step S520 is issued to the passenger in a manner similar to steps S430 and S470. Together with the notification to the passenger, a signal indicating information on the presence of a living body or metal and information on the electric transmission section 10 where the living body or metal is present is sent to a road administrator over a network or the like.

If no living body or metal is determined to be present (YES at S500), it is then determined whether a vehicle 1 requesting power supply is present in the charge lane 50b. Specifically, as described above, the count of vehicle 1 is incremented when a vehicle 1 requesting power supply passes through the entrance gate 51, and the count of vehicle 1 is decremented when a vehicle 1 requesting power supply passes through the exit gate 52. Thus, what is determined is whether the count is 0 or not, based on which the above determination is made.

If it is determined that a vehicle 1 requesting power supply is present in the charge lane 50b (YES at S530), control returns to step S490. In contrast, if it is determined that a vehicle 1 requesting power supply is not present in the charge lane 50b (NO at S530), current supply to the electric transmission pads 11 is stopped (S540) and the process is terminated.

As described above, when the present disclosure is applied to the non-contact power supply control system in which a running vehicle 1 is subjected to non-contact power supply, the advantageous effects similar to those of the first embodiment are obtained. In addition, since living body detection and metal detection are performed for the individual electric transmission sections 10 to supply current to only those electric transmission pads 11 which are determined there is no living body or metal in the vicinity, safety is improved.

In the present embodiment, steps S410 to S470 may be performed periodically. In other words, if there is no vehicle 1 requesting power supply in the charge lane 50b, living body detection and metal detection may be ensured to be performed. This can improve safety even more.

Third Embodiment

A third embodiment of the present disclosure will be described. In the present embodiment, in contrast to the first embodiment, the outer heat flux sensors 12b and 32b are not provided. Since the rest of the configuration is similar to that of the first embodiment, description is omitted here.

A non-contact power supply control system of the present embodiment has a configuration basically similar to that of the first embodiment, however, the outer heat flux sensors 12b and 32b of the first embodiment are not provided.

Figure 10:
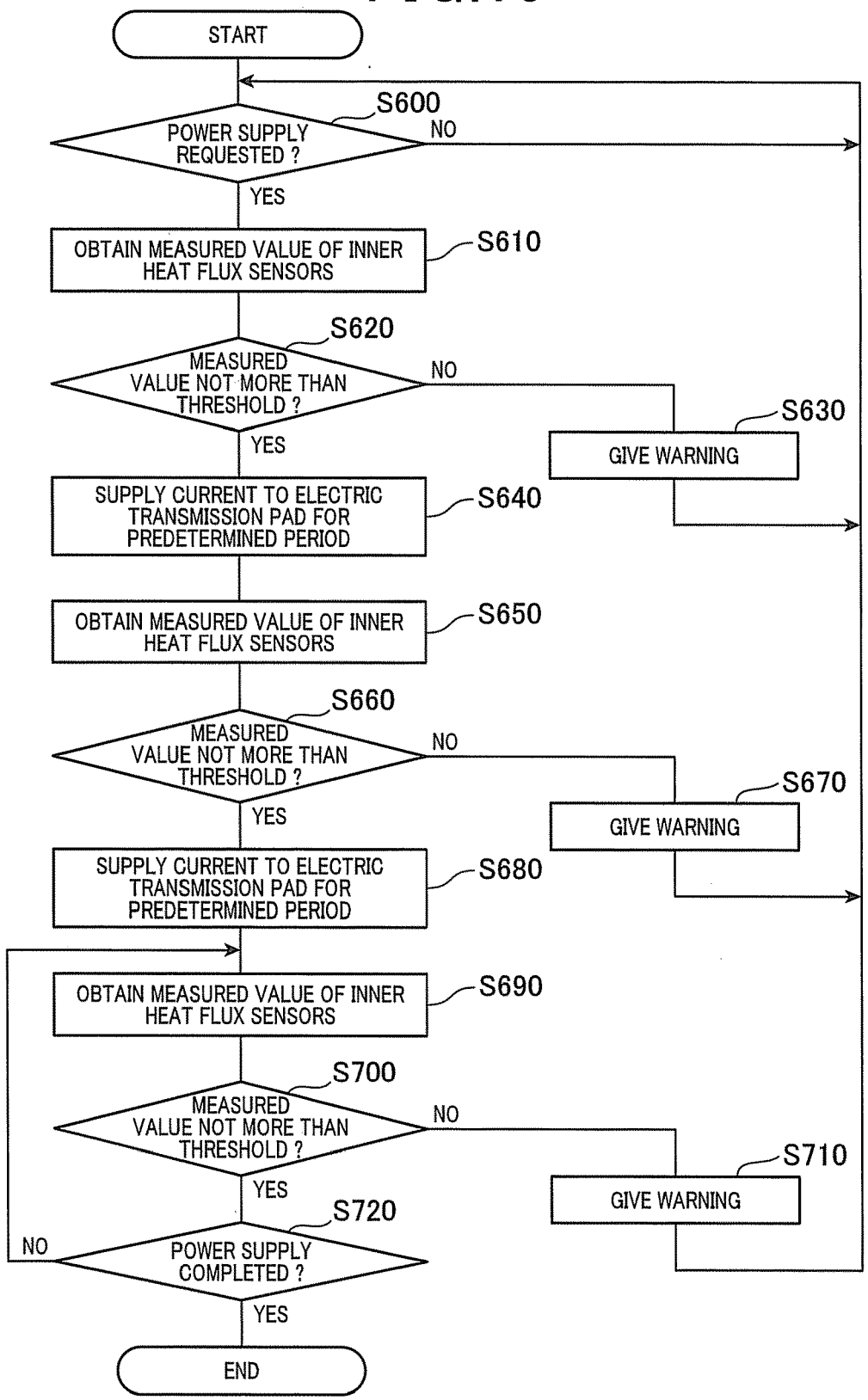
FIG. 10 is a flow chart illustrating an operation of a ground-side control unit according to a third embodiment of the present disclosure.

With reference to FIG. 10, an operation of a ground-side control unit 23 in the non-contact power supply control system of the present embodiment will be described. Since the operation of the ground-side control unit 23 of the present embodiment is basically the same as the one shown in FIG. 7 referred to in the first embodiment, the following description is focused on differences.

Specifically, if it is determined that a power supply has been requested (YES at 600), a measured value of inner heat flux sensors 12a and 32a is obtained because of the absence of the outer heat flux sensors 12b and 32b (S610).

Then, if it is determined that the measured value obtained at step S610 is not more than a threshold (YES at S620), current supply to electric transmission pads 11 is performed for a predetermined period (S640), and then a measured value of the inner heat flux sensors 12a and 32a is obtained (S650).

If it is determined that the measured value obtained at step S650 is not more than a threshold (YES at S660), current is supplied to the electric transmission pads 11 only for a predetermined period (S680). That is, in the first embodiment described above, current supply to the electric transmission pads 11 is stopped at step S310 or S340 if step S280 is performed, whereas at step S680 of the present embodiment, current supply to the electric transmission pads 11 is stopped after lapse of a predetermined period from current supply to the electric transmission pads 11.

Since step S680 is performed for storing power in the power storage unit 41 by supplying current to the electric transmission pads 11, the period of current supply is longer than the period of current supply at step S640 for metal detection.

Then, after step S680, a measured value of the inner heat flux sensors 12a and 32a is obtained (S690), and it is determined whether the measured value obtained at step S690 is not more than a threshold (S700). If the measured value is determined to be larger than the threshold, a step of issuing an alarm similar to step S320 is performed (S710).

In other words, since the outer heat flux sensors 12b and 32b are not provided in the present embodiment, living body detection and metal detection cannot be performed, with current being supplied to the electric transmission pads 11. Therefore, at step S680, current is supplied to the electric transmission pads 11 only for a predetermined period, and after stopping the current supply to the electric transmission pads 11, living body detection and metal detection are performed again.

If the measured value is determined not to be more than the threshold (YES at S700), it is determined whether power supply has been completed, similar to step S330 described above (S720). If the power supply has been completed, the process is terminated (YES at S720).

As described above, if the present disclosure is applied to the non-contact power supply control system not provided with the outer heat flux sensors 12*b* and 32*b*, the advantageous effects similar to those of the first embodiment are obtained.

Other Embodiments

The present disclosure is not limited to the foregoing embodiments, but may be appropriately modified within the scope of the claims.

For example, in the above embodiments, the power receiving section 30 does not have to be necessarily provided with the heat flux sensors 32*a* and 32*b*. That is, the vehicle 1 does not have to be necessarily provided with the living body detecting means and the metal detecting means.

In addition, in the above embodiments, metal detection does not have to be necessarily performed. For example, in the first embodiment, steps S240 to S270 do not have to be necessarily performed. The non-contact power supply control system configured in this way is also capable of preventing application of an electromagnetic field to a living body when electric power is supplied to the power storage unit 41 by supplying current to the electric transmission pad 11.

The above embodiments have been described by way of examples of using the heat flux sensors 12*a* and 12*b* as a detecting means. However, other sensors may be used as a detecting means. For example, ultrasonic sensors or the like may be used as a detecting means for detecting a living body, while inductive proximity sensors, capacitive proximity sensors, or the like may be used as a detecting means for detecting a metal object.

The above embodiments may be appropriately combined with each other. That is, the first and second embodiments may be combined to ensure electric power supply to the power storage unit 41 during parking and running. In addition, the second and third embodiments may be combined to omit the outer heat flux sensors 12*b* and 32*b* from the electric transmission units 10 built up or buried in the charge lane 50*b* and from the power receiving section 30.

Reference Example 1

In the above embodiments, non-contact power supply control systems have been described. However, the heat flux sensors of the present disclosure can also be used for constituting a safety control system for factories and the like.

That is, the present reference example is associated with a safety control system which includes:

processing equipment applying predetermined processing to a workpiece;

an entrance gate provided in the processing equipment to serve as an entrance when the workpiece is conveyed into the processing equipment;

a conveyor conveying the workpiece placed thereon by an operator into the processing equipment; and a control unit controlling operation of the processing equipment, characterized in that:

the entrance gate is arranged with a heat flux sensor outputting a sensor signal according to heat flux, and the control unit compares a measured value corresponding to the sensor signal with a first threshold, stops operation of the processing equipment if the measured value is determined to be larger than the first threshold, compares the measured value with a second threshold smaller than the first threshold if the measured value is determined to be not more than the first threshold, and gives a warning to the operator if the measured value is determined to be larger than the second threshold.

Figure 11:
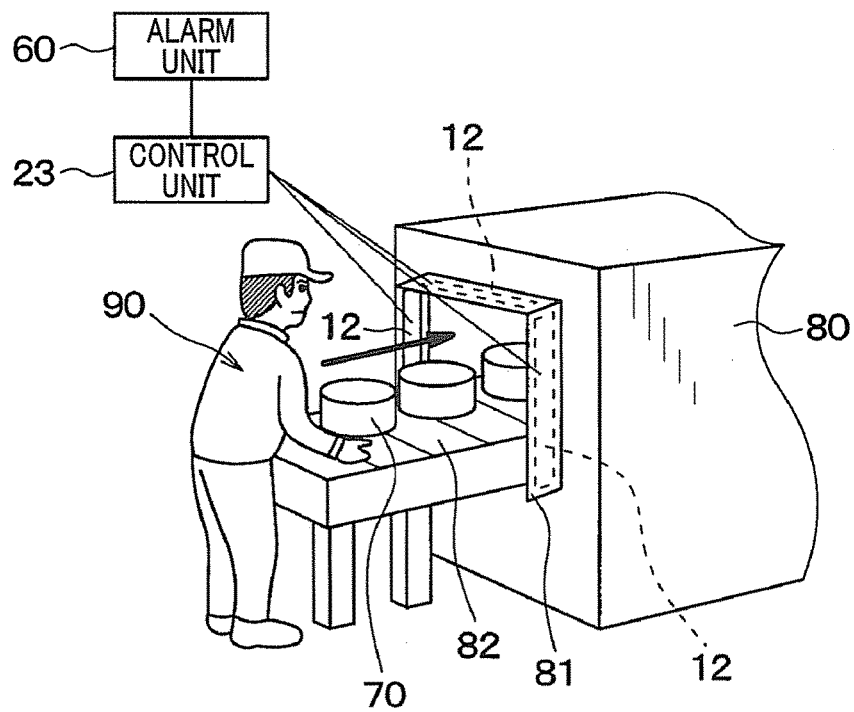
FIG. 11 is a schematic view illustrating a configuration of a safety control system according to a reference example 1.

Specifically, as shown in FIG. 11, heat flux sensors 12 are installed in an entrance gate 81 of processing equipment 80 and connected to a control unit 23. The processing equipment 80 applies predetermined processing to a workpiece 70, such as a printed circuit board. When placed on a conveyor 82 by an operator 90, the workpiece 70 is ensured to be conveyed into the processing equipment 80 by the conveyor 82.

Similar to the above embodiments, as shown in FIGS. 3 to 5, each of the heat flux sensors 12 in use is an integration of the insulating substrate 100, the front surface protective member 110, and the back surface protective member 120. In the integrated body, the first and second interlayer connection members 130 and 140 are alternately connected in series.

Similar to the ground-side control unit 23 in the above embodiments, the control unit 23 is configured by a CPU, various memories constituting a storing means, peripheral devices, and the like, and connected to an alarm unit 60 including an audio means, a lighting means, a display means, or the like. Then, based on a measured value corresponding to the sensor signals of the heat flux sensors 12, the control unit 23 stops the operation of the processing equipment 80 or issues an alarm by driving the alarm unit 60.

The present reference example is a safety control system to detect an object that comes close to or passing through the entrance gate 81, using the heat flux sensors 12 provided in the entrance gate 81. Thus, the system is capable of performing detection by making a distinction between the operator 90 and the workpiece 70. This is because heat flux due to the radiant heat of the workpiece 70 is sufficiently small relative to heat flux due to the radiant heat of the operator 90. For example, when the temperature of the workpiece 70 is equal to room temperature, appropriate setting of a threshold in advance will enable the control unit 23 to detect only the operator 90 without detecting the workpiece 70.

Figure 12:
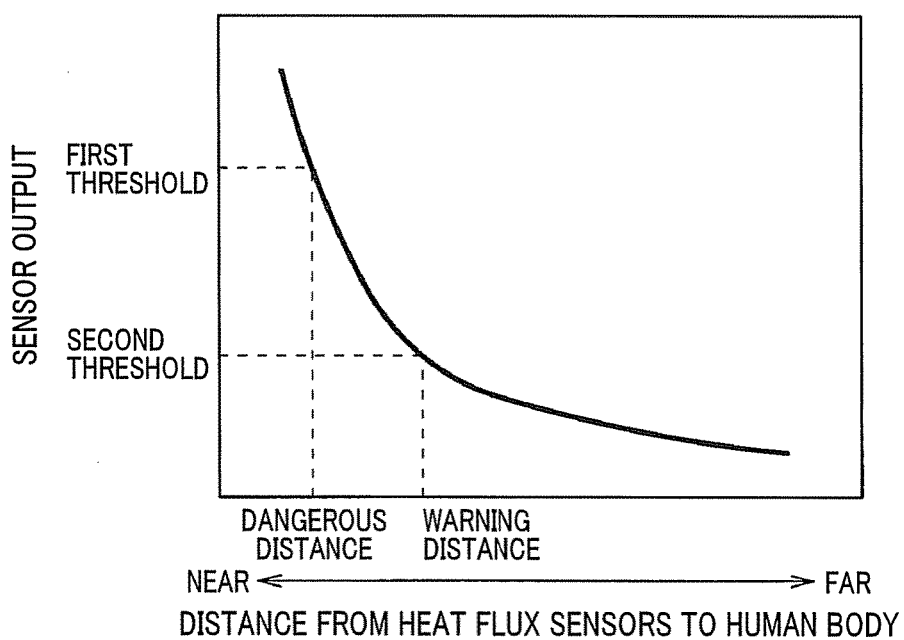
FIG. 12 is a diagram illustrating a relationship of a distance from heat flux sensors to a human body, with sensor signals.

A distance relationship of the heat flux sensors 12 with the operator (human body) 90 will be described. As described above, the heat flux sensors 12 output sensor signals according to the radiant heat emitted from a human body. As shown in FIG. 12, level of the sensor signals become larger as the human body comes closer to the heat flux sensors 12. In other words, levels of the sensor signals become larger as the human body comes closer to the entrance gate 81. Thus, when the human body (operator 90) comes excessively close (within a dangerous distance) to the entrance gate 81, level of sensor signals larger than a first threshold are outputted. When the human body (operator 90) comes a little closer (warning distance) to the entrance gate 81, level of sensor signals larger than a second threshold are outputted.

With reference to FIG. 13, the operation of the control unit 23 of the present reference example will be described. The operation of the control unit 23 is started when the operator 90 turns on a switch, not shown.

Firstly, a measured value of the heat flux sensors 12 is obtained (S810). The measured value obtained at step S800 may be based on sensor signals (electromotive voltage) outputted from the heat flux sensors 12, or may be based on a heat flux value obtained by converting the sensor signals to heat flux. As described above, sensor signals in accord with a distance from the heat flux sensors 12 (entrance gate 81) to the operator (human body) 90 are outputted from the heat flux sensors 12.

Then, it is determined whether the measured value obtained at step S800 is not more than a first threshold (S220). The first threshold is a value indicating that the operator 90 comes excessively close to the entrance gate 81 and has a risk of being caught in the processing equipment 80.

If the measured value is larger than the first threshold (NO at S810), the operator 90 is determined to be excessively close to the entrance gate 81. In this case, when the operator 90 keeps working in this situation, there is a risk that a hand, for example, of the operator 90 is caught in the processing equipment 80. Therefore, a signal indicating stop of the equipment is transmitted to a control unit, not shown, on the processing equipment 80 side to stop the operation of the processing equipment 80 (S820), and then the process is terminated.

If the measured value is determined to be not more than the first threshold (YES at S810), it is determined whether the measured value is not more than a second threshold (S830). The second threshold is set to be smaller than the first threshold and indicates that there is a low risk of the operator 90 being immediately caught in the processing equipment 80, but indicates that the operator 90 has come closer to the processing equipment 80 side than a prescribed position.

If the measured value is larger than the second threshold (NO at S830), there is a risk of a hand, for example, of the operator 90, being caught in the processing equipment 80 should the operator 90 keeps working in this situation. Therefore, by driving the alarm unit 60 that includes an audio means, a lighting means, a display means, or the like, a warning is given to the operator 90 (S840). If the measured value is determined to be not more than the second threshold (YES at S830), the process is terminated.

The warning at step S840 is given as follows, for example. That is, the operator 90 can be warned by an electronic sound as an audio means in the alarm unit 60. Also, the operator 90 can be warned by the lighting of a warning light or the like as a lighting means. Further, by installing a liquid crystal display or the like as a display means in the vicinity of the entrance gate 81, the operator 90 can be warned by a warning displayed on the liquid crystal display.

As described above, in the present reference example, safety can be meticulously managed. Specifically, for example, a phototube may be arranged, for safety management, at the entrance gate 81 to detect the operator 90 by the phototube. However, since such a phototube detects both the operator 90 and the workpiece 70 entering into a detection area without being able to distinguish between them, there is a possibility that the equipment is stopped when the workpiece 70 passes through the area. In contrast, in the present reference example, an appropriate threshold is set in advance for a measured value of the heat flux sensors 12, so that the workpiece 70 can pass through the entrance gate 81 without being detected, but only the operator 90 can be selectively detected.

It is true that a phototube can detect the presence of the operator 90, however, to perform processing according to a distance between the entrance gate 81 (heat flux sensors 12) and the operator 90, a plurality of sets of phototubes have to be installed according to the distance. In contrast, in the present reference example, since the heat flux sensors 12 output sensor signals according to the distance to a human body, safety management can be performed only by a set of heat flux sensors 12 (heat flux sensors 12 arranged only in the entrance gate 81), according to the distance between the entrance gate 81 (heat flux sensors 12) and the operator 90.

The description herein has been given by way of an example of comparing a measured value with first and second thresholds. However, a measured value may be compared with an even more plurality of thresholds. In addition, since the sensor signals of the heat flux sensors 12 vary by the clothes, physical conditions, and the like of the operator 90, the first and second thresholds are preferably set depending on situations.

REFERENCE SIGNS LIST

11 Electric transmission pad
12a, 32a Inner heat flux sensor
12b, 32b Outer heat flux sensor
21 Power supply unit
23 Control Unit
31 Power Receiving Pad
41 Power storage unit
50 Road surface

The invention claimed is:
1. A non-contact power supply control system, comprising:
an electric transmission pad arranged on a road surface side and connected to an external power supply unit;
a control unit controlling current supply to the electric transmission pad by controlling the power supply unit;
a living body detecting means detecting a living body present around the electric transmission pad;
a power receiving pad mounted to a vehicle and magnetically coupled to the electric transmission pad to excite power when current is supplied from the power supply unit to the electric transmission pad;
a power storage unit mounted to the vehicle to store power excited by the power receiving pad; and
a metal detecting means arranged on the road surface side to detect metal present around the electric transmission pad, wherein
the living body detecting means is arranged on the road surface side,
the control unit, when determining that no living body is present around the electric transmission pad on the basis of a result from the living body detecting means, controls the power supply unit to supply current to the electric transmission pad, thereby exciting power in the power receiving pad to store the power in the power storage unit,
the control unit, when determining that no living body is present around the electric transmission pad on the basis of a result from the living body detecting means and when determining that no metal is present around the electric transmission pad on the basis of a result from the metal detecting means, controls the power supply unit to store power in the power storage unit,
the living body detecting means and the metal detecting means are configured with common heat flux sensors that output sensor signals according to heat flux,
the heat flux sensors includes, when viewed from a direction normal to the road surface, inner heat flux sensors arranged inside the electric transmission pad and outer heat flux sensors arranged around the electric transmission pad, and the control unit compares a measured value based on the sensor signals outputted from the outer heat flux sensors with a predetermined threshold, while supplying current to the electric transmission pad to cause the power storage unit to store power, and when the measured value is more than the predetermined threshold, determines that at least either one of the living body and the metal is present around the electric transmission pad and stops current supply to the electric transmission pad.

2. The non-contact power supply control system according to claim 1, wherein the control unit compares a measured value based on the sensor signals with a predetermined threshold before current is supplied to the electric transmission pad to cause the power storage unit to store power, determines that no living body is present around the electric transmission pad when the measured value is not more than the predetermined threshold, supplies current to the electric transmission pad for a predetermined period to heat the metal when it is determined that no living body is present but metal is present around the electric transmission pad, followed by comparing the measured value based on the sensor signals with a predetermined threshold, and determines that no metal is present around the electric transmission pad when the measured value is not more than the predetermined threshold, to start current supply to the electric transmission pad and cause the power storage unit to store power.

3. The non-contact power supply control system according to claim 1, wherein the heat flux sensors are arranged, when viewed from a direction normal to the road surface, inside the electric transmission pad, and the control unit supplies current to the electric transmission pad for a predetermined period to cause the power storage unit to store power, followed by comparing a measured value based on the sensor signals outputted from the heat flux sensors with the predetermined threshold, and, when the measured value is more than the predetermined threshold, determines that at least either one of the living body and the metal is present around the electric transmission pad.

4. The non-contact power supply control system according to claim 1, wherein each of the heat flux sensors is configured to include an insulating substrate made of a thermoplastic resin where a plurality of first and second via holes penetrating in a thickness direction are formed, the first and second via holes being filled with first and second interlayer connection members made of metals different from each other, the first and second interlayer connection members being alternately connected in series, and at least one of the metals forming the first and second interlayer connection members is a sintered alloy where a plurality of metal atoms are sintered in a state of maintaining a crystal structure of the metal atoms.

5. A non-contact power supply control system, comprising:

an electric transmission pad arranged on a road surface side and connected to an external power supply unit;

a control unit controlling current supply to the electric transmission pad by controlling the power supply unit;

a living body detecting means detecting a living body present around the electric transmission pad;

a power receiving pad mounted to a vehicle and magnetically coupled to the electric transmission pad to excite power when current is supplied from the power supply unit to the electric transmission pad;

a power storage unit mounted to the vehicle to store power excited by the power receiving pad; and a metal detecting means arranged on the road surface side to detect metal present around the electric transmission pad, wherein the living body detecting means is arranged on the road surface side, the control unit, when determining that no living body is present around the electric transmission pad on the basis of a result from the living body detecting means, controls the power supply unit to supply current to the electric transmission pad, thereby exciting power in the power receiving pad to store the power in the power storage unit, the control unit, when determining that no living body is present around the electric transmission pad on the basis of a result from the living body detecting means and when determining that no metal is present around the electric transmission pad on the basis of a result from the metal detecting means, controls the power supply unit to store power in the power storage unit, the living body detecting means and the metal detecting means are configured with common heat flux sensors that output sensor signals according to heat flux, the heat flux sensors are arranged, when viewed from a direction normal to the road surface, inside the electric transmission pad, and the control unit supplies current to the electric transmission pad for a predetermined period to cause the power storage unit to store power, followed by comparing a measured value based on the sensor signals outputted from the heat flux sensors with the predetermined threshold, and, when the measured value is more than the predetermined threshold, determines that at least either one of the living body and the metal is present around the electric transmission pad.

6. A non-contact power supply control system, comprising:

an electric transmission pad arranged on a road surface side and connected to an external power supply unit;

a control unit controlling current supply to the electric transmission pad by controlling the power supply unit;

a living body detecting means detecting a living body present around the electric transmission pad;

a power receiving pad mounted to a vehicle and magnetically coupled to the electric transmission pad to excite power when current is supplied from the power supply unit to the electric transmission pad;

a power storage unit mounted to the vehicle to store power excited by the power receiving pad; and a metal detecting means arranged on the road surface side to detect metal present around the electric transmission pad, wherein the living body detecting means is arranged on the road surface side, the control unit, when determining that no living body is present around the electric transmission pad on the basis of a result from the living body detecting means, controls the power supply unit to supply current to the electric transmission pad, thereby exciting power in the power receiving pad to store the power in the power storage unit, the control unit, when determining that no living body is present around the electric transmission pad on the basis of a result from the living body detecting means and when determining that no metal is present around the electric transmission pad on the basis of a result from the metal detecting means, controls the power supply unit to store power in the power storage unit, the living body detecting means and the metal detecting means are configured with common heat flux sensors that output sensor signals according to heat flux, each of the heat flux sensors is configured to include an insulating substrate made of a thermoplastic resin where a plurality of first and second via holes penetrating in a thickness direction are formed, the first and second via holes being filled with first and second interlayer connection members made of metals different from each other, the first and second interlayer connection members being alternately connected in series, and at least one of the metals forming the first and second interlayer connection members is a sintered alloy where a plurality of metal atoms are sintered in a state of maintaining a crystal structure of the metal atoms.

\* \* \* \* \*